United States Patent
Hintze-Brüning et al.

(10) Patent No.: US 7,202,294 B2
(45) Date of Patent: Apr. 10, 2007

(54) COATING MATERIALS AND THE USE THEREOF FOR PRODUCING COATINGS WHICH CAN BE SOLDERED

(75) Inventors: Horst Hintze-Brüning, Münster (DE); Lothar Jandel, Münster (DE); Ralf Neuhaus, Drensteinfurt (DE); Markus Ruckpaul, Münster (DE); Marc Bäumer, Münster (DE)

(73) Assignee: BASF Coatings AG, Munster (DE)

( * ) Notice: Subject to any disclaimer, the term of this patent is extended or adjusted under 35 U.S.C. 154(b) by 63 days.

(21) Appl. No.: 10/497,643

(22) PCT Filed: Jan. 15, 2003

(86) PCT No.: PCT/EP03/00320

§ 371 (c)(1),
(2), (4) Date: Jun. 4, 2004

(87) PCT Pub. No.: WO03/062327

PCT Pub. Date: Jul. 31, 2003

(65) Prior Publication Data

US 2005/0085565 A1  Apr. 21, 2005

(30) Foreign Application Priority Data

Jan. 24, 2002  (DE) ................ 102 02 543

(51) Int. Cl.
| | |
|---|---|
| *C08J 3/00* | (2006.01) |
| *C08K 3/32* | (2006.01) |
| *C08K 3/34* | (2006.01) |
| *C08K 11/00* | (2006.01) |
| *C08L 31/00* | (2006.01) |

(52) U.S. Cl. ............. 524/442; 524/401; 524/404; 524/405; 524/414; 524/417; 524/430; 524/439; 524/441; 524/492; 524/493; 524/543

(58) Field of Classification Search ............... 524/401, 524/404, 405, 414, 417, 430, 439, 441, 492, 524/493, 543, 442
See application file for complete search history.

(56) References Cited

U.S. PATENT DOCUMENTS

| | | | |
|---|---|---|---|
| 4,086,096 A | 4/1978 | McLeod | |
| 4,119,763 A | 10/1978 | Blair | |
| 4,724,172 A | 2/1988 | Mosser et al. | |
| 4,837,253 A | 6/1989 | Mansell et al. | |
| 5,612,093 A | 3/1997 | Braig et al. | |
| 5,726,225 A | 3/1998 | Braig et al. | |
| 5,874,197 A * | 2/1999 | Felten ............... | 430/281.1 |
| 6,083,308 A | 7/2000 | Fletcher | |
| 6,126,730 A | 10/2000 | Yoshida et al. | |
| 6,176,907 B1 | 1/2001 | Glausch | |
| 2003/0175541 A1 | 9/2003 | Lorenz et al. | |

FOREIGN PATENT DOCUMENTS

| | | |
|---|---|---|
| DE | 19623268 | 12/1996 |
| DE | 10022075 | 11/2001 |
| EP | 0551063 A1 | 7/1993 |
| EP | 0760387 A1 | 3/1997 |
| WO | WO03/062328 | 7/2003 |

\* cited by examiner

*Primary Examiner*—Patrick Niland

(57) ABSTRACT

Coating materials comprising at least one electrically conductive pigment (A1) having an at least bimodal particle size distribution and at least one binder, the pigment/binder ratio being >1.5:1, can be used as coil coating materials.

22 Claims, No Drawings

COATING MATERIALS AND THE USE THEREOF FOR PRODUCING COATINGS WHICH CAN BE SOLDERED

CROSS REFERENCE TO RELATED APPLICATIONS

This application is a National Phase Application of Patent Application PCT/EP03/00320 filed on 15 Jan. 2003, which claims priority to DE 102 02 543.6, filed on 24 Jan. 2002.

The present invention relates to novel coating materials, particularly coil coating materials. The present invention also relates to the use of the novel coating materials for producing weldable coatings, particularly on coils.

Coil coating materials, which are applied predominantly by roller application using contrarotating rolls to steel coils (strips or long sheets), especially galvanized steel coils, or aluminum coils, are known. Since the processing of the metal does not take place until after the coating process, the coatings need to have extremely high mechanical integrity. Typical drying times are from 20 to 40 seconds at a metal temperature of from 200 to 260° C. The coating coils are used customarily in the architectural sector for producing ceiling and wall elements, doors, pipe insulations, roller shutters or window profiles, in the vehicle sector for producing paneling for caravans or truck bodies, and in the household sector for producing profile elements for washing machines, dishwashers, freezers, fridges or ranges (cf. Römpp Lexikon Lacke und Druckfarben, Georg Thieme Verlag, Stuttgart, N.Y., 1998, "coil coating", page 55, and "coil coating materials", page 116).

In order to simplify further the production of motor vehicles from a technical standpoint, and to make it more economic, it is desired to use preformed, coated profile elements and moldings for producing vehicle bodies. For this to be possible, however, the coated coils and the profile elements and moldings produced from them need to be able to be spot welded.

With the preformed, coated profile elements and moldings it is also intended that further improvements be made in corrosion protection for the bodies, so that corrosion protection measures, such as the flooding of cavities with wax, become superfluous. A further requirement is that the corrosion protection afforded by cathodically deposited and heat-cured electrocoats on coils be improved further, or that it be possible to do without the electrocoats entirely.

It is an object of the present invention to provide novel coating materials, especially coil coating materials, which give novel coatings which possess extremely high mechanical integrity and particularly good weldability, especially by spot welding. It is also intended that the novel coating materials, particularly the coil coating materials, should be able to be formulated where appropriate with anticorrosion pigments so that the novel coatings produced from them continue to have a particularly high corrosion protection effect without impairing weldability. At the same time, the novel coating materials, especially the coil coating materials, are to give novel coatings which produce better weld spots with a smooth, still aesthetically appealing periphery. It is also intended that the weld connections should be particularly strong. The novel coatings, furthermore, are to feature a comparatively broad welding range and a comparatively low volume resistance, and result in a particularly high tool life quantity in terms of the welding electrodes.

The invention accordingly provides the novel coating materials comprising at least one electrically conductive pigment (A1) having an at least bimodal particle size distribution and at least one binder, the pigment/binder ratio being >1.5:1.

In the text below, the novel coating materials are referred to as "coating materials of the invention".

Further subject matter of the invention will emerge from the description.

In the light of the prior art it was surprising and unforeseeable for the skilled worker that the object on which the present invention was based could be achieved by means of the coating material of the invention.

In particular it was surprising that the coating materials of the invention, especially the coil coating materials of the invention, produced coatings of the invention which have extremely high mechanical integrity and particularly good weldability, particularly by spot welding. In addition, the coating materials of the invention, especially the coil coating materials of the invention, could be formulated with anticorrosion pigments, so that the coatings of the invention produced from them continue to afford particularly high corrosion protection without impairing weldability. At the same time the coating materials of the invention, especially the coil coating materials of the invention, gave coatings of the invention which produced better weld spots with a smoother, still aesthetically appealing periphery. In addition, the weld connections were particularly strong. Moreover, the coatings of the invention feature a comparatively broad welding range and a comparatively low volume resistance and resulted in a particularly high welding electrode life quantity; in other words, the number of weld spots that could be applied with one electrode was very high.

The inventively essential constituent of the coating materials of the invention is at least one electrically conductive pigment (A1) having an at least bimodal, especially bimodal, particle size distribution, the pigment/binder ratio being >1.5:1, preferably >2.4:1, and more preferably >2.8:1. The upper limit on the pigment/binder ratio is preferably 4:1. With particular preference, the pigment/binder ratio is from 2.9:1 to 3.2:1.

The average particle sizes of the electrically conductive pigment (A1) may vary widely. They are preferably between 0.5 and 50 μm, in particular from 1 to 30 μm. 90% by weight of the finer fraction of the electrically conductive pigment (A1) preferably have an average particle size of from 1 to 20 μm, in particular from 3 to 16 μm. 90% by weight of the coarser fraction of electrically conductive pigment (A1) preferably have an average particle size of from 3 to 30 μm, in particular from 5 to 22 μm.

The weight ratio of finer fraction to coarser fraction may vary widely and is preferably from 1.4:1 to 1:1.4, more preferably from 1.3:1 to 1:1.3, with particular preference from 1.2:1 to 1:1.2, and in particular 1:1.

The amount of the electrically conductive pigments (A1) in the coating materials of the invention may vary widely and is guided by the requirements of the case in hand, in particular by the electrical conductivity of the coatings of the invention that is required for very good weldability. Preferably, the electrically conductive pigments (A1) are present in the coating materials of the invention in an amount of from 10 to 80%, more preferably from 15 to 75%, with particular preference from 20 to 75%, and particularly from 30 to 75% by weight, based in each case on the solids of the coating material of the invention.

Suitable electrically conductive pigments (A1) include a very wide variety of organic and inorganic pigments. The pigments (A1) are preferably selected from the group consisting of elemental silicon and metallic, water-insoluble phosphides, preferably from the group consisting of CrP, MnP, $Fe_3P$, $Fe_2P$, $Ni_2P$, $NiP_2$ and $NiP_3$. In particular, iron phosphides (A1) are employed.

The iron phosphides are commercial products and are sold, for example, under the brand name Ferrophos® (fine: Ferrophos® HRS 2132; coarse: Ferrophos® HRS 2131).

The pigments (A1) are added to coating materials which are known per se. These coating materials can be one-component or multicomponent systems, especially two-component systems. The coating materials of the invention may also be formulated on the basis of organic solvents (conventional coating materials) or aqueous media (aqueous coating materials). Alternatively, they may be substantially or completely solvent-free and water-free liquid coating materials (100% systems) or substantially or completely solvent-free and water-free, solid, pulverulent coating materials (powder coating materials). The powder coating materials may also be in the form of aqueous dispersions, also known as powder slurries.

The coating materials of the invention may be cured thermally, with actinic radiation, or both thermally and with actinic radiation. Here and below, actinic radiation means electromagnetic radiation, such as near infrared, visible light, UV radiation or X-rays, especially UV radiation, or corpuscular radiation, such as electron beams. Joint curing with heat and actinic radiation is also referred to by those in the art as dual cure.

The coating materials of the invention can be used for coating motor vehicle bodies and parts thereof, the interior and exterior of motor vehicles, the inside and outside of buildings, doors, windows, and furniture, and, in the context of industrial coating, for the coating of small parts, coils, containers, packaging, electrical components, and white goods.

This extremely broad usefulness of the coating materials of the invention represents a particular advantage.

With particular preference, the coating materials of the invention are coil coating materials. The coil coating materials of the invention (referred to below for the sake of brevity as "coatings of the invention") may likewise be one-component or multicomponent, especially two-component, systems; preferably, they are one-component systems. They can be formulated on the basis of organic solvents or aqueous media. They can also, however, be substantially or completely solvent-free and water-free liquid coatings (100% systems) or substantially or completely solvent-free and water-free powder coating materials. The powder coating materials can also be in the form of powder slurries. With very particular preference, conventional coatings of the invention are used.

The coatings of the invention can be cured thermally, with actinic radiation, or both thermally and with actinic radiation. They are preferably cured thermally. In this context they may be thermally self-crosslinking or externally crosslinking. They are preferably externally crosslinking.

Besides the mixture according to the invention, the coatings of the invention comprise constituents such as are customary and known in the field of coil coating materials, such as binders, crosslinking agents, organic solvents, and additives.

The binders are preferably selected from the group consisting of random, alternating, and block, linear, branched, and comb addition (co)polymers of ethylenically unsaturated monomers, polyaddition resins and/or polycondensation resins which are curable physically, thermally, with actinic radiation, and both thermally and with actinic radiation. Regarding these terms, refer for further details to Römpp Lexikon Lacke und Druckfarben, Georg Thieme Verlag, Stuttgart, N.Y., 1998, page 457, "polyaddition" and "polyaddition resins (polyadducts)", and pages 463 and 464, "polycondensates", "polycondensation", and "polycondensation resin".

The binders are preferably selected from the group consisting of (meth)acrylate addition (co)polymers, partially hydrolyzed polyvinyl esters, polyesters, alkyds, polylactones, polycarbonates, polyethers, epoxy resin-amine adducts, polyureas, polyamides, polyimides, and polyurethanes, especially polyesters.

The preparation of polyesters is described, for example, in the standard work Ullmanns Encyklopädie der technischen Chemie, 3rd edition, volume 14, Urban & Schwarzenberg, Munich, Berlin, 1963, pages 80 to 89 and 99 to 105, and also in the following books: "Résines Alkydes-Polyesters", by J. Bourry, Dunod, Paris, 1952, "Alkyd Resins" by C. R. Martens, Reinhold Publishing Corporation, New York, 1961, and "Alkyd Resin Technology" by T. C. Patton, Interscience Publishers, 1962.

The self-crosslinking binders of the thermally curable coatings of the invention and of the dual-cure coatings of the invention contain reactive functional groups which are able to undergo crosslinking reactions with groups of their own kind ("with themselves") or with complementary reactive functional groups.

The externally crosslinking binders contain reactive functional groups which are able to undergo crosslinking reactions with complementary reactive functional groups that are present in crosslinking agents (cf. Römpp Lexikon Lacke und Druckfarben, Georg Thieme Verlag, Stuttgart, N.Y., 1998, "curing", pages 274 to 276, especially page 275).

Examples of suitable complementary reactive functional groups for use in accordance with the invention are assembled in the following overview. In the overview, the variable $R^4$ stands for an acyclic or cyclic aliphatic radical, an aromatic radical and/or an aromatic-aliphatic (araliphatic) radical; the variables $R^5$ and $R^6$ stand for identical or different aliphatic radicals or are linked with one another to form an aliphatic or heteroaliphatic ring.

Overview: Examples of Complementary Reactive Functional Groups

| Binder and crosslinking agent or Crosslinking agent and binder | |
|---|---|
| —SH | —C(O)—OH |
| —$NH_2$ | —C(O)—O—C(O)— |
| —OH | —NCO |
| —O—(CO)—NH—(CO)—$NH_2$ | —NH—C(O)—$OR^4$ |
| —O—(CO)—$NH_2$ | —$CH_2$—OH |

-continued

| Binder and crosslinking agent or Crosslinking agent and binder | |
|---|---|
| >NH | —CH$_2$—OR$^4$ |
| | —NH—CH$_2$—OR$^4$ |
| | —NH—CH$_2$—OH |
| | —N(—CH$_2$—OR$^4$)$_2$ |
| | —NH—C(O)—CH(—C(O)OR$^4$)$_2$ |
| | —NH—C(O)—CH(—C(O)OR$^4$)(—C(O)—R$^4$) |
| | —NH—C(O)—NR$^5$R$^6$ |
| | >Si(OR$^4$)$_2$ |
| | $\overset{O}{\overset{|}{-\!-\!\text{CH}-\!-\!\text{CH}_2}}$ |
| | $\overset{\displaystyle O}{\underset{\displaystyle -\!-\!\text{CH}-\!-\!\text{CH}_2}{\overset{\displaystyle \|}{\underset{\displaystyle O\quad\quad O}{C}}}}$ |
| —C(O)—OH | $\overset{O}{\overset{|}{-\!-\!\text{CH}-\!-\!\text{CH}_2}}$ |
| | —CH—CH$_2$ |
| | —N=C=N— |
| | —C(O)—N(CH$_2$—CH$_2$—OH)$_2$ |

The selection of the respective complementary groups is guided on the one hand by the consideration that they should not undergo any unwanted reactions, particularly no premature crosslinking, during the preparation, storage, and application of the coatings of the invention and/or must not disrupt or inhibit, where appropriate, the actinic radiation cure, and on the other hand by the temperature range within which crosslinking is to take place.

For the coatings of the invention it is preferred to employ crosslinking temperatures of up to 270° C. Preference is therefore given to employing thio, hydroxyl, N-methylolamino, N-alkoxymethylamino, imino, carbamate, allophanate and/or carboxyl groups, preferably hydroxyl or carboxyl groups, on the one hand and, preferably, crosslinking agents containing anhydride, carboxyl, epoxy, blocked isocyanate, urethane, methylol, methylol ether, siloxane, carbonate, amino, hydroxyl and/or beta-hydroxyalkylamide groups, preferably epoxy, beta-hydroxyalkylamide, blocked isocyanate, urethane or alkoxymethylamino groups, on the other.

In the case of self-crosslinking coatings of the invention the binders contain in particular methylol, methylol ether and/or N-alkoxymethylamino groups.

Complementary reactive functional groups especially suitable for use in the externally crosslinking coatings of the invention are
  carboxyl groups on the one hand and epoxide groups and/or beta-hydroxyalkylamide groups on the other, and also
  hydroxyl groups on the one hand and blocked isocyanate, urethane or alkoxymethylamino groups, especially blocked isocyanate groups, on the other.

The functionality of the binders in respect of the reactive functional groups described above may vary very widely and is guided in particular by the target crosslinking density and/or by the functionality of the particular crosslinking agents employed. In the case of carboxyl-containing binders, for example, the acid number is preferably from 10 to 100, more preferably from 15 to 80, with particular preference from 20 to 75, with very particular preference from 25 to 70, and in particular from 30 to 65 mg KOH/g. Or, in the case of hydroxyl-containing binders, the OH number is preferably from 15 to 300, more preferably from 20 to 250, with particular preference from 25 to 200, with very particular preference from 30 to 150, and in particular from 35 to 120 mg KOH/g. Or, in the case of binders containing epoxide groups, the epoxide equivalent weight is preferably from 400 to 2500, more preferably from 420 to 2200, with particular preference from 430 to 2100, with very particular preference from 440 to 2000, and in particular from 440 to 1900.

The complementary functional groups described above can be incorporated into the binders by the customary and known methods of polymer chemistry. This can be done, for example, by incorporating monomers which carry the corresponding reactive functional groups, and/or by means of polymer-analogous reactions.

The binders of the dual-cure coatings of the invention and of the coatings of the invention that are curable by actinic radiation alone further contain on average per molecule at least one, preferably at least two, group(s) having at least one bond which can be activated with actinic radiation.

In the context of the present invention, a bond which can be activated with actinic radiation is a bond which, on exposure to actinic radiation, becomes reactive and, with other activated bonds of its kind, undergoes polymerization reactions and/or crosslinking reactions which proceed in accordance with radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds.

In the dual-cure coatings of the invention it is, however, also possible to employ mixtures of binders curable by means of heat alone and binders curable solely with actinic radiation.

The amounts of the above-described binders in the coatings of the invention may vary widely and is guided by the requirements of the case in hand, in particular by the functionality of any crosslinking agents used. In accordance with the invention, the binders are employed in an amount so as to give the inventively essential pigment/binder ratio.

Examples of suitable crosslinking agents are amino resins, as described, for example, in Römpp Lexikon Lacke und Druckfarben, Georg Thieme Verlag, 1998, page 29, "amino resins", in the textbook "Lackadditive" [Additives for coatings] by Johan Bieleman, Wiley-VCH, Weinheim, N.Y., 1998, pages 242 ff., in the book "Coatings, Coatings and Solvents", second, completely revised edition, edited by D. Stoye and W. Freitag, Wiley-VCH, Weinheim, N.Y., 1998, pages 80 ff., in the patents U.S. Pat. No. 4,710,542 A1 or EP-B-0 245 700 A1, and in the article by B. Singh and coworkers "Carbamylmethylated Melamines, Novel Crosslinkers for the Coatings Industry", in Advanced Organic Coatings Science and Technology Series, 1991, volume 13, pages 193 to 207, resins or compounds containing carboxyl groups, as described, for example, in the patent DE 196 52 813 A1, compounds and resins containing epoxide groups, as described, for example, in the patents EP 0 299 420 A1, DE 22 14 650 B1, DE 27 49 576 B1, U.S. Pat. No. 4,091,048 A1 or U.S. Pat. No. 3,781,379 A1, non-blocked and blocked polyisocyanates, as described, for example, in the patents U.S. Pat. No. 4,444,954 A1, DE '96 17 086 A1, DE 196 31 269 A1, EP 0 004 571 A1 or EP 0 582 051 A1, and/or tris(alkoxycarbonylamino)triazines, as described in the patents U.S. Pat. No. 4,939,213 A1, U.S. Pat. No. 5,084,541 A1, U.S. Pat. No. 5,288,865 A1 or EP 0 604 922 A1.

With particular preference, blocked polyisocyanates are used. In particular, use is made of the polyisocyanates blocked with the blocking agents known from the German patent application DE 199 14 896 A1, column 12 line 13 to column 13 line 2, especially polyisocyanates blocked with caprolactam.

The amount of the crosslinking agent in the coatings of the invention may vary widely and is governed by the requirements of the case in hand, in particular by the functionality of the binders used.

Particular preference is given to using one-component systems composed of hydroxyl-containing polyesters and caprolactam-blocked polyisocyanates. These one-component systems are commercial products and are sold, for example, under the brand name Vesticoat® EPUB 877.

The amount of crosslinking agents and binders in the coatings of the invention is preferably from 10 to 60%, more preferably from 12 to 55%, with particular preference from 15 to 50%, and in particular from 15 to 45% by weight, based in each case on the solids of the respective coating of the invention.

The coating of the invention may comprise an organic solvent. Examples of customary and known solvents are described in D. Stoye and W. Freitag (eds.), "Coatings, Coatings and Solvents, 2nd, completely revised edition, Wiley-VCH, Weinheim, N.Y., 1998, "14.9. Solvent Groups", pages 327 to 373. In the coating of the invention they are used preferably in an amount of from 5 to 50% by weight, in particular from 5 to 40% by weight, based on the coating of the invention.

The coating material of the invention not least comprises at least one typical coatings additive selected from the group consisting of organic and inorganic additives.

Examples of suitable typical coatings additives are color and/or effect pigments and corrosion-inhibiting pigments, fillers, nanoparticles, reactive diluents for the thermal cure or the actinic radiation cure, rheological aids, UV absorbers, light stabilizers, radical scavengers, radical polymerization initiators, thermal crosslinking catalysts, photoinitiators and photocoinitiators, slip additives, polymerization inhibitors, defoamers, emulsifiers, devolatilizers, wetting agents, dispersants, adhesion promoters, leveling agents, film forming auxiliaries, rheology control additives (thickeners), flame retardants, siccatives, driers, antiskinning agents, other corrosion inhibitors, waxes, and flatting agents, such as are known from the textbook "Lackadditive" by Johan Bieleman, Wiley-VCH, Weinheim, N.Y., 1998, or the German patent application DE 199 14 896 A1, column 13 line 56 to column 15 line 54.

Examples of especially suitable additives are silylamines, such as bis(trimethylsilyl)amine, which is sold under the brand name Aerosil® R 812 S, epichlorohydrins, such as bisphenol A epichlorohydrin, which is sold under the brand name Epikote® 834, a self-crosslinking urethane resin, which is sold under the brand name Desmodur® VPLS 2253, and dibutyltin dilaurate.

Examples of very particularly highly suitable additives are corrosion-inhibiting pigments (pigments (A2)).

It is possible to use the customary and known corrosion-inhibiting pigments (A2). Preferably they are selected from the group consisting of zinc phosphate, zinc metaborate, and barium metaborate monohydrate, especially zinc phosphate and barium metaborate monohydrate.

Zinc phosphate is a commercial compound and is sold, for example, under the brand name Sicor® ZNP/S. Barium metaborate monohydrate is likewise a commercial compound and is sold, for example, under the brand name Butrol® 11M2.

Instead of or in addition to the pigments (A2) it is possible to use amorphous silica modified with metal ions preferably selected from the group consisting of alkali metal ions, alkaline earth metal ions, especially calcium ions, scandium ions, yttrium ions and lanthanum ions, lanthanide ions, and zinc ions and aluminum ions (pigments (A3)). Preference is given to employing calcium ions.

Amorphous silica modified with calcium ions (A3) is also a commercial product and is sold, for example, under the brand name Shieldex®.

It is of particular advantage if at least one compound (A4) of the general formula I is used together with the pigments (A2) and (A3):

$$M_n(X)_m \qquad (I)$$

in which the variables and indices have the following meanings:

M is at least one central atom selected from the group of Lewis acceptors,

X stands for Lewis donor ligands having at least one bridging atom selected from elements of main groups 5 and 6 of the periodic table of the elements, n is from 1 to 500, and m is from 3 to 2000.

The compounds I can be monomeric (mononuclear) or dimeric, oligomeric or polymeric (polynuclear).

In the general formula I, the variable M stands for at least one central atom selected from the group of Lewis acceptors. It is preferably selected from the group consisting of aluminum, titanium, and zirconium. Preferably, M is titanium.

In the general formula I, the variables X stand for Lewis donor ligands having at least one bridging atom selected from the elements of main groups 5 and 6 of the periodic table of the elements. The bridging atom is preferably selected from the group consisting of nitrogen, phosphorus, oxygen, and sulphur atoms, especially phosphorus and oxygen atoms.

Lewis acceptors and Lewis donors are Lewis acids and bases in the sense of the Lewis acid-base theory.

In the general formula I the index n stands for a number, particularly an integer, from 1 to 500, preferably from 1 to 100, more preferably from 1 to 50, with particular preference from 1 to 20, and in particular from 1 to 20. The index m stands for a number, particularly an integer, from 3 to 2000, preferably from 3 to 1000, more preferably from 3 to 500, with particlar preference from 3 to 100, and in particular from 3 to 50.

Examples of highly suitable compounds I are monomeric, dimeric, oligomeric or polymeric alkoxides of aluminum or titanium, such as $Al_3(O\text{-tert-butyl})_6$, $Al_4(O\text{-isopropyl})_{12}$, or $Ti(O\text{-ethyl})_4$.

Examples of especially suitable compounds of the general formula I are compounds of the general formula II:

$$RO-M[-O-P(O)(OH)-O-P(O)(OR^1)_2]_3 \cdot HP(O)(OR^2)_2 \quad (II)$$

in which the variables R, $R^1$ and $R^2$ independently of one another stand for aliphatic and cycloaliphatic radicals and M is as defined above and is selected in particular from the group consisting of aluminum, titanium, and zirconium. With particular preference, M is titanium.

In the general formula II the variables R, $R^1$, and $R^2$ stand independently of one another for aliphatic and cycloaliphatic, especially aliphatic, radicals. The aliphatic radicals preferably contain from 3 to 20 carbon atoms. Examples of suitable aliphatic radicals are propyl, isopropyl, butyl, sec-butyl, isobutyl, tert-butyl, n-pentyl, isoamyl, n-hexyl, n-heptyl, octyl, isooctyl, nonyl, decyl, undecyl, dodecyl, tridecyl, tetradecyl, pentadecyl, hexadecyl, heptadecyl, octadecyl, nonadecyl, and eicosanyl, preferably isopropyl, octyl and isooctyl. With particular preference R is isopropyl, $R^1$ is octyl, and $R^2$ is isooctyl.

With very particular advantage, therefore, use is made of the adduct of isopropyl tris(dioctylpyrophosphato)titanate with one mole of diisooctyl phosphite as constituent (A4). The adduct is a commercial compound and is sold, for example, under the brand name KEN-REACT® by Kenrich Petrochemicals.

Where used, the constituent (A2) is present in the coatings of the invention in an amount of preferably from 0.1 to 10%, more preferably from 0.3 to 8%, with particular preference from 0.5 to 7%, with very particular preference from 1 to 5%, and in particular from 1.5 to 4% by weight, based in each case on the solids of the respective coating of the invention.

The constituent (A3), where used, is present in the coatings of the invention in an amount of preferably from 0.1 to 10%, more preferably from 0.3 to 8%, with particular preference from 0.5 to 7%, with very particular preference from 1 to 5%, and in particular from 1.5 to 4% by weight, based in each case on the solids of the respective coating of the invention.

Where used, the constituent (A4) is present in the coatings of the invention in an amount of preferably from 0.01 to 5%, more preferably from 0.03 to 4%, with particular preference from 0.05 to 3%, with very particular preference from 0.1 to 2.5%, and in particular from 0.2 to 2% by weight, based in each case on the solids of the respective coating of the invention.

It is particularly advantageous to use all three constituents (A2), (A3), and (A4) together. In this case, the weight ratio of the constituents (A2), (A3), and (A4) may vary widely. It preferably varies within the confines of the amounts indicated above.

In particular, however, the constituents (A2), (A3), and (A4) are present in a weight ratio of 1:(0.5 to 1.5, especially 0.8 to 1.2):(0.1 to 2, especially 0.2 to 0.6). The weight. ratio may also be 1:(0.5 to 1.5):(0.2 to 0.6) or 1:(0.8 to 1.2):(0.1 to 2). With particular preference the weight ratio is 1:(0.8 to 1.2):(0.2 to 0.6).

The weight ratio of constituent (A1) on the one hand to the constituents (A2), (A3), and (A4) on the other may vary widely. It is, however, of advantage if the weight ratio of constituent (A1) on the one hand to the constituents (A2), (A3), and (A4) on the other is from 20:1 to 5:1, preferably from 15:1 to 5:1, with particular preference from 12:1 to 5:1, with very particular preference from 10:1 to 7:1, and in particular from 9:1 to 7:1.

The preparation of the coatings of the invention has no special features as far as this method is concerned but instead takes place by the mixing of the constituents described above. This can be done using mixing equipment such as stirred tanks, dissolvers, including inline dissolvers, bead mills, stirrer mills, static mixers, toothed wheel dispersers or extruders. Where appropriate, it is carried out with exclusion of actinic radiation in order to prevent damage to the coating of the invention which is curable solely or additionally with actinic radiation. In the course of preparation, the individual constituents of the mixture according to the invention can be incorporated separately. Alternatively, the mixture of the invention can be prepared separately and mixed with the other constituents. Preferably, the individual constituents of the mixture according to the invention are incorporated separately.

The coatings of the invention are outstandingly suitable for coil coating. Coil coating starts from a coil of metal which has conventionally been cleaned, degreased, passivated, chemically treated, rinsed, and dried. The metal coil can be coated on one or both sides.

Suitable metals are all those from which it is possible to form coils which are equal to the mechanical, chemical, and thermal stresses of coil coating. Highly suitable metal coils are those based on aluminum or iron. In the case of iron, cold-rolled steels, electrolytically zinc-plated steels, hot-dip galvanized steels, or stainless steels are especially suitable. Preferably, the metal sheets of the coils have a thickness of from 200 μm to 2 mm.

For coil coating, the metal coil passes through a coil coating line, such as is described, for example, in Römpp Lexikon Lacke und Druckfarben, Georg Thieme Verlag, Stuttgart, N.Y., 1998, page 55, "coil coating", or in the German patent application DE 196 32 426 A1, at a speed adapted to the application and curing properties of the coatings of the invention that are employed. The speed may therefore vary very widely from one coating process to another. It is preferably from 10 to 150, more preferably from 12 to 120, with particular preference from 40 to 100, with very particular preference from 16 to 80, and in particular from 20 to 70 m/min.

The coatings of the invention may be applied in any desired manner; for example, by spraying, flowcoating or roller coating. Of these application techniques, roller coating is particularly advantageous and is therefore used with preference in accordance with the invention.

Each application step in roller coating may be conducted using two or more rolls. Preference is given to the use of from two to four, and especially two, rolls.

In roller coating, the rotating pickup roll dips into a reservoir of the coating of the invention and so picks up the coating to be applied. This coating is transferred by the pickup roll, directly or via at least one transfer roll, to the rotating application roll. From this latter roll, the coating is transferred onto the coil by means of codirectional or counterdirectional contact transfer.

Alternatively, the coating of the invention may be pumped directly into a gap or nip between two rolls, this being referred to by those in the art as nip feed.

In accordance with the invention, counterdirectional contact transfer, or the reverse roller coating process, is of advantage and is therefore employed with preference.

In roller coating, the peripheral speeds of the pickup roll and application roll may vary very greatly from one coating process to another. The application roll preferably has a peripheral speed which is from 110 to 125% of the coil speed, and the pickup roll preferably has a peripheral speed which is from 20 to 40% of the coil speed.

The coatings of the invention are preferably applied in a wet film thickness such that curing of the coating films results in coatings which are weldable, in particular by spot welding, and have a dry film thickness of from 4 to 12 µm, more preferably from 5 to 10 µm, with particular preference from 5 to 9.5 µm, and in particular from 6 to 9 µm.

The application methods described above can be employed with the coating materials with which the coatings of the invention are overcoated, except where they are powder coating materials or electrocoat materials, for which the customary and known, special application methods are used, such as electrostatic powder spraying in the case of low-speed coils or the powder cloud chamber process in the case of high-speed coils, and cathodic electrodeposition coating.

In the case of heat curing, heating of the coating films of the invention takes place preferably by means of convective heat transfer, irradiation with near or far infrared and/or, in the case of iron-based coils, by means of electrical induction. The maximum substrate temperature is preferably 270° C. and in particular 260° C.

The heating time, i.e., the duration of the heat cure, varies depending on the coating of the invention that is used. It is preferably from 10 s to 2 min.

Where use is made substantially of convective heat transfer, forced air ovens with a length of from 30 to 50 m, in particular from 35 to 45 m, are required at the preferred coil running speeds. The temperature of the forced air is preferably 350° C.

Thermal curing of the coating films of the invention may also be assisted by exposure to actinic radiation.

Alternatively, curing may take place with actinic radiation alone, as is described, for example, in the German patent application DE 198 35 206 A1.

The curing methods described above can of course also be used for the coating films with which the corrosion protection coatings of the invention are overcoated.

If two or more coating materials are applied during the coil coating operation, this is carried out in an appropriately configured line, in which two or more applications and, where appropriate, curing stations are interposed in series. Alternatively, following application and curing of the first coating material, i.e., the coating of the invention, the coated coil is wound up again and is then provided on one or both sides with second, third, etc. coatings in a second, third, etc. coil coating line.

Following the production of the coated coils, they can be wound up and then processed further at another place; alternatively, they can be processed further as they come directly from the coil coating operation. For instance, they may be laminated with plastics or provided with removable protective films. After cutting into appropriately sized parts, they may be shaped. Examples of suitable shaping methods include pressing and deep drawing.

The resultant coils, profile elements, and moldings of the invention are scratch resistant, corrosion stable, weathering stable, and chemicals stable, and can be overcoated with any of a wide variety of coating materials, without problems. It is surprising that there is no need for chromate pretreatment of the metal coils in order to obtain excellent corrosion protection.

In particular, however, the coils, profile elements, and moldings of the invention are outstandingly weldable, especially by spot welding. The coatings of the invention produce better weld spots with a smoother, aesthetically more appealing periphery. In addition, the welded connections are particularly strong. The coatings of the invention also feature a comparatively broad welding range and a comparatively low volume resistance, and result in a particularly high welding electrode life quantity; in other words, the number of weld spots that can be applied using one electrode is particularly high.

The coils coated with the coatings of the invention are therefore outstandingly suitable for applications in automotive construction for the purpose, for example, of producing bodywork parts and bodies, truck bodies, and caravan paneling, in the household appliance sector for producing, for example, washing machines, dishwashers, driers, fridges, freezers or ranges, in the lighting sector for producing lights for interior and exterior use, or in the interior and exterior architectural sector, for producing, for example, ceiling and wall elements, doors, gates, pipe insulation, roller shutters or window profiles.

EXAMPLES

Example 1

The preparation of an Inventive Coil Coating Coating

In a suitable vessel with stirrer, the following components were mixed in this order: 26.9 parts by weight of a one-component system based on a saturated, hydroxyl-containing polyester and a caprolactam-blocked polyisocyanate (Vesticoat® EPUB 877 from Hüls AG), 0.6 part by weight of bis(trimethylsilyl)amine (Aerosil® R 812 S from Degussa), 2.47 parts by weight of silica modified with calcium ions (Shieldex® from Grace Davison), 2.73 parts by weight of zinc phosphate (Sicor® ZNP/S from Waardals Kjemiske Fabriken), 0.99 part by weight of the adduct of isopropyl tris(dioctylpyrophosphato)titanate with one mol of diisooctyl phosphite (KEN-REACT® KR38S from Kenrich Petrochemicals), and 4.5 parts by weight of Solvesso® 150 (ExxonMobil Chemicals). This mixture was predispersed using a dissolver for ten minutes. The resulting mixture was transferred to a bead mill with a cooling jacket, and was mixed with 2 mm SAZ glass beads. The material for milling was milled for 12 minutes to a Hegmann particle size of from 10 to 15 µm. The resulting millbase was then separated from the glass beads.

To the millbase there were added, with stirring, in this order, 3.55 parts by weight of bisphenol A epichlorohydrin (Epikote® 834 from Shell Resins), 1.78 parts by weight of a commercial self-crosslinking urethane resin (Desmodur® VPLS 2253 from Bayer AG), 0.1 part by weight of dibutyltin dilaurate, and 4.26 parts by weight of Solvesso® 150.

With the dissolver running slowly, the resultant mixture was admixed with 26.3 parts by weight of finely divided iron phosphide (Ferrophos® HRS 2132; average particle size: 3 to 16 μm) and 26.3 parts by weight of coarsely particulate iron phosphide (Ferrophos® HRS 2131; average particle size: 5 to 22 μm) (weight ratio 1:1). After a further ten minutes, the desired dispersion of the electrically conductive pigments was reached.

The inventive coil coating coating had a pigment/binder ratio of 3:1 and was outstandingly suitable for the coil coating process.

Example 2

The Production of an Inventive Coating

For Example 2, the inventive coil coating coating from Example 1 was used. Using coating rods, it was applied to steel plates of grades Z and ZE with chromate-free pretreatment, in a wet film thickness such that curing thereof in a through-type drier with a forced-air temperature of 350° C. and a substrate temperature of 220° C. gave coatings with a dry film thickness of 8 μm.

In order to determine the weldability of the steel plates of Example 2, pairs of steel plates were spot welded to one another in accordance with a DaimlerChrysler standard known to those in the art. Measurements were made of the welding range (kA), the volume resistance (ohms), and the electrode life quantities, i.e., the number of weld spots that could be applied using one electrode. In addition, quality features, such as the quality of the weld spots and the smoothness and aesthetics of the periphery of the weld spots, were assessed visually and each scored as follows:

| Rating | Signification |
|--------|---------------|
| 1 | very good |
| 2 | good |
| 3 | satisfactory, still usable |
| 4 | poor, unusable. |

Furthermore, the strength of the welded connections was determined qualitatively by hand and scored as follows:

| Rating | Signification |
|--------|---------------|
| 1 | very strong, virtually inseparable by hand |
| 2 | strong, difficult to separate by hand |
| 3 | easy to loosen by hand |

The results are given in the table. They demonstrate that the inventive steel plates of Example 2 can be spot welded very effectively to automotive quality standards.

TABLE

The spot weldability of the inventive steel plates (Example 2)

| Properties | Example 2 |
|------------|-----------|
| Welding range (kA) | 1.9 |
| Volume resistance (ohms) | 0.0187 |
| Electrode life quantity (number of spots) | 1000 |
| Quality of the weld spots | 1 |
| Periphery | 1 |
| Strength | 1 |

What is claimed is:

1. A coating material comprising at least one electrically conductive pigment (A1) having an at least bimodal particle size distribution and at least one binder selected from the group consisting of block, linear, branched, and comb addition (co)polymers of ethylenically unsaturated monomers, polyaddition resins, and polycondensation resins, the pigment/binder ratio being >1.5:1, wherein said electrically conductive pigment (A1) is selected from the group consisting of elemental silicon and metallic, water-insoluble phosphides.

2. The coating material of claim 1, wherein 90% by weight of a finer fraction of the electrically conductive pigment (A1) has an average particle size of from 1 to 20 μm and 90% by weight of a coarser fraction of the electrically conductive pigment (A1) has an average particle size of from 3 to 30 μm.

3. The coating of claim 1, wherein the weight of finer fraction to coarser fraction is from 2:1 to 1:2.

4. The coating material of claim 1, wherein the electrically conductive pigment (A1) in present in an amount of from 10 to 80% by weight, based on the solids of the coating material.

5. The coating material of claim 1 further comprising at least one corrosion-inhibiting pigment (A2).

6. The coating material of claim 5, wherein said corrosion-inhibiting pigments (A2) are selected from the group consisting of zinc phosphate, zinc metaborate, and barium metaborate monohydrate.

7. The coating material of claim 1 further comprising at least one amorphous silica (A3) modified with metal ions.

8. The coating material of claim 7, wherein the metal ions in the compound (A3) are selected from the group consisting of alkali metal ions, alkaline earth metal ions, scandium ions, yttrium ions, lanthanum ions, lanthanide ions, zinc ions, and aluminum ions.

9. The coating material of claim 1 further comprising at least one compound (A4) of the general formula I:

$$M_n(X)_m \qquad (I)$$

in which the variables and indices have the following meanings:
M is at least one central atom selected from the group of Lewis acceptors,
X stands for Lewis donor ligands having at least one bridging atom selected from elements of main groups 5 and 6 of the periodic table of the elements,
n is from 1 to 500, and
m is from 3 to 2000.

10. The coating material of claim 9, wherein the central atom M is selected from the group consisting of aluminum, titanium, and zirconium.

11. The coating material of claim 9, wherein the bridging atom X in the compound (A4) is selected from the group consisting of nitrogen, phosphorus, oxygen, and sulfur atoms.

12. The coating material of claim 9, wherein the compound (A4) is selected from the group consisting of compounds (A4) of the general formula II:

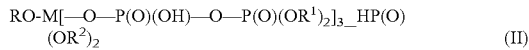

$$RO-M[-O-P(O)(OH)-O-P(O)(OR^1)_2]_{3-}HP(O)(OR^2)_2 \quad (II)$$

in which the variables R, $R^1$, and $R^2$ independently of one another stand for aliphatic and cycloaliphatic radicals and M is titanium, zirconium or aluminum.

13. The coating material of claim 5, further comprising at least one amorphous silica (A3 modified with metal ions and at least one compound (A4) of the general formula I:

$$M_n(X)_m \quad (I)$$

in which the variables and indices have the following meanings:
  M is at least one central atom selected from the group of Lewis acceptors,
  X stands for Lewis donor ligands having at least one bridging atom selected from elements of main groups 5 and 6 of the periodic table of the elements,
  n is from 1 to 500, and
  m is from 3 to 2000;
wherein the constituents (A2), (A3), and (A4) are in a weight ratio of 1:(0.5 to 1.5):(0.1 to 2).

14. The coating material of claim 13, wherein the weight ratio of constituent (A1) on the one hand to constituents (A2), (A3), and (A4) on the other is from 20:1 to 5:1.

15. The coating material of claim 5, wherein constituent (A2) is present in an amount of from 0.1 to 10% by weight, based on the solids of the coating material.

16. The coating material of claim 7, wherein constituent (A3) is present in an amount of from 0.1 to 10% by weight, based on the solids of the coating material.

17. The coating material of claim 9, wherein constituent (A4) is present in an amount of from 0.01 to 5% by weight, based on the solids of the coating material.

18. The coating material of claim 1, wherein the coating material is a one-component system.

19. The coating of claim 1, wherein the coating material is curable thermally, with actinic radiation, or both thermally and with actinic radiation.

20. The coating material of claim 1, wherein the coating material is one of a solvent containing coating material; an aqueous coating material; a solvent-free and water-free liquid coating material; a solvent-free and water-free, solid pulverulent coating material; or an aqueous dispersion of a powder coating material.

21. The coating material of claim 20, wherein the coating material is a solvent containing coating material.

22. The coating material of claim 1, wherein the coating material is a coil coating material.

* * * * *